(12) United States Patent
Kim et al.

(10) Patent No.: US 11,538,635 B2
(45) Date of Patent: Dec. 27, 2022

(54) MULTILAYERED CAPACITOR AND BOARD FOR MOUNTING THE SAME

(71) Applicant: SAMSUNG ELECTRO-MECHANICS CO., LTD., Suwon-si (KR)

(72) Inventors: Hyo Joong Kim, Suwon-si (KR); Dong Su Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 104 days.

(21) Appl. No.: 17/010,408

(22) Filed: Sep. 2, 2020

(65) Prior Publication Data

US 2021/0327647 A1 Oct. 21, 2021

(30) Foreign Application Priority Data

Apr. 20, 2020 (KR) .................. 10-2020-0047201

(51) Int. Cl.
*H01G 4/30* (2006.01)
*H01G 2/06* (2006.01)
*H01G 4/12* (2006.01)
*H01G 4/012* (2006.01)

(52) U.S. Cl.
CPC ............... *H01G 4/30* (2013.01); *H01G 2/065* (2013.01); *H01G 4/012* (2013.01); *H01G 4/12* (2013.01)

(58) Field of Classification Search
CPC ........ H01G 4/012; H01G 4/1227; H01G 4/33; H01G 4/248; H01G 4/0085; H01G 4/232; H01G 4/30; H01G 4/065; H01G 4/12
See application file for complete search history.

(56) References Cited

U.S. PATENT DOCUMENTS

| | | | |
|---|---|---|---|
| 2009/0310277 A1* | 12/2009 | Kayatani | H01G 4/005 29/25.42 |
| 2009/0316330 A1* | 12/2009 | Taniguchi | H01G 4/30 361/306.3 |
| 2014/0211368 A1 | 7/2014 | Fujii | |
| 2015/0016014 A1* | 1/2015 | Park | H01G 4/30 156/89.12 |
| 2015/0318110 A1* | 11/2015 | Lee | H01G 4/30 361/301.4 |

(Continued)

FOREIGN PATENT DOCUMENTS

| KR | 10-2014-0095977 A | 8/2014 |
|---|---|---|
| KR | 10-1525666 B1 | 6/2015 |

*Primary Examiner* — Michael P McFadden
(74) *Attorney, Agent, or Firm* — Morgan, Lewis & Bockius LLP

(57) ABSTRACT

A multilayer capacitor includes a body including a plurality of dielectric layers, an active region and upper and lower cover regions; first and second internal electrodes disposed with the dielectric layer interposed therebetween in the active region to be alternately exposed through both end surfaces of the body; and first and second external electrodes disposed on both ends of the body and connected to the first and second internal electrodes, respectively. The body further includes a buffer layer including first and second dummy electrodes disposed on a lower surface of the lower cover region to be spaced apart from each other in a length direction of the body, and a groove is recessed in a lower surface of the buffer layer.

21 Claims, 5 Drawing Sheets

(56) References Cited

U.S. PATENT DOCUMENTS

| | | | |
|---|---|---|---|
| 2016/0111216 A1* | 4/2016 | Lee | H01G 4/232 |
| | | | 361/301.4 |
| 2016/0240310 A1* | 8/2016 | Kim | H01G 4/0085 |
| 2017/0162326 A1* | 6/2017 | Kowase | H01G 4/012 |
| 2019/0279819 A1* | 9/2019 | Horn | H01G 4/255 |

* cited by examiner

I-I'

MULTILAYERED CAPACITOR AND BOARD FOR MOUNTING THE SAME

CROSS-REFERENCE TO RELATED APPLICATION(S)

This application claims benefit of priority to Korean Patent Application No. 10-2020-0047201 filed on Apr. 20, 2020 in the Korean Intellectual Property Office, the disclosure of which is incorporated herein by reference in its entirety.

TECHNICAL FIELD

The present disclosure relates to a multilayer capacitor and a board for mounting the same.

BACKGROUND

There is increasing demand for passive elements due to high performance of IT and mobile devices such as electronic products, computers, and the like.

Further, as a number of mounted components increases, amounting density for the components increases because recent electronic devices require the passive elements to be disposed in a limited board area.

Such passive elements mounted in a high density manner generate heat and vibrations due to interactions with each other. In this regard, functional improvement is required in addition to characteristics required in existing passive elements.

A multilayer ceramic capacitor (MLCC), a multilayer chip electronic component, can be used in various electronic devices, due to advantages thereof, such as a small size, high capacitance and ease of mounting.

The multilayer ceramic capacitor may have a structure in which a plurality of dielectric layers and internal electrodes having different polarities are alternately laminated while being interposed between the dielectric layers.

In this case, since the dielectric layers have piezoelectric properties, when a direct current voltage or an alternating current voltage is applied to the multilayer ceramic capacitor, a piezoelectric phenomenon may be generated between the internal electrodes, such that a volume of a ceramic body is expanded and contracted according to a frequency, thereby generating periodic vibrations.

Such vibrations are transmitted to a board through external electrodes and a solder when mounted on the multilayer capacitor such that the entire board becomes a sound reflective surface to generate a vibration sound to be a noise.

The vibration sound may be in an audible frequency region of 20 Hz to 20,000 Hz, causing listener discomfort, and such a vibration sound causing listener discomfort refers to acoustic noise.

Due to a decrease in noise of components of recent electronic devices, such acoustic noise generated in the multilayer capacitor may be more prominent. Particularly in the case of a mobile device, acoustic performance and durability can be greatly improved by reducing such acoustic noise. Accordingly, research into technology capable of effectively decreasing acoustic noise generated in a multilayer capacitor is in demand.

SUMMARY

An aspect of the present disclosure is to provide a multilayer capacitor capable of effectively reducing acoustic noise and a board for mounting the same.

According to an aspect of the present disclosure, a multilayer capacitor includes a body including a plurality of dielectric layers laminated therein, an active region and upper and lower cover regions; first and second internal electrodes disposed with the dielectric layer interposed therebetween in the active region to be alternately exposed through both end surfaces of the body; and first and second external electrodes disposed on both ends of the body and connected to the first and second internal electrodes, respectively. The body further includes a buffer layer comprising first and second dummy electrodes disposed on a lower surface of the lower cover region to be spaced apart from each other in a length direction of the body, and a groove is recessed in a lower surface of the buffer layer.

In an example embodiment, the groove may extend from one side surface to the other side surface in a width direction of the body.

In an example embodiment, the first and second dummy electrodes may be disposed on a single dielectric layer to face each other in a length direction.

In an example embodiment, the first and second dummy electrodes may be exposed through both end surfaces of the body and connected to the first and second external electrodes.

In an example embodiment, the groove may be disposed between the first and second dummy electrodes In an example embodiment, a thickness of the lower cover region may be greater than a distance between the first and second internal electrodes in the active region.

In an example embodiment, a plurality of the grooves may be disposed on a lower surface of the buffer layer.

In an example embodiment, each of the plurality of the grooves may extend from one side surface to the other side surface in a width direction of the body.

In an example embodiment, the buffer layer may further include a third dummy electrode disposed between the first and second dummy electrodes.

In an example embodiment, the first to third dummy electrodes may be spaced apart from each other on a single dielectric layer in the length direction of the body.

In an example embodiment, the first and second dummy electrodes may be exposed through both end surfaces of the body and connected to the first and second electrodes.

In an example embodiment, one of the plurality of the grooves may be disposed between the first and third dummy electrodes and another of the plurality of the grooves may be disposed between the second and third dummy electrodes.

In an example embodiment, the groove may be intersected by a line connecting the first and second dummy electrodes.

According to another aspect, a board for mounting a multilayer capacitor includes board including first and second electrode pads on one surface thereof; and the multilayer capacitor. The first and second electrodes of the multilayer capacitor are mounted to be connected to the first and second electrodes pads, respectively.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
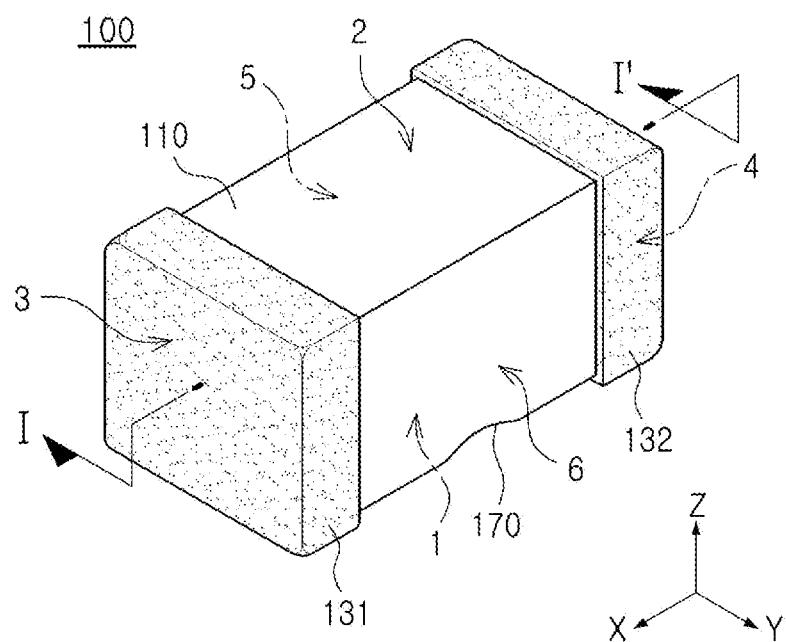
FIG. 1 is a perspective diagram schematically illustrating a multilayer capacitor according to an example embodiment of the present disclosure.

Hereinafter, embodiments of the present disclosure will be described as follows with reference to the attached drawings.

The present disclosure may, however, be embodied in many different forms and should not be construed as being limited to the specific embodiments set forth herein.

Rather, these embodiments are provided so that this disclosure will be thorough and complete, and will fully convey the scope of the disclosure to those skilled in the art.

Shapes and sizes of elements in the drawings may be exaggerated for clarity of description, and elements indicated by the same reference numeral are the same elements in the drawings.

Further, throughout the specification, it will be understood that when a portion "includes" an element, it can further include another element, not excluding another element, unless otherwise indicated.

Multilayer Capacitor

Figure 2:
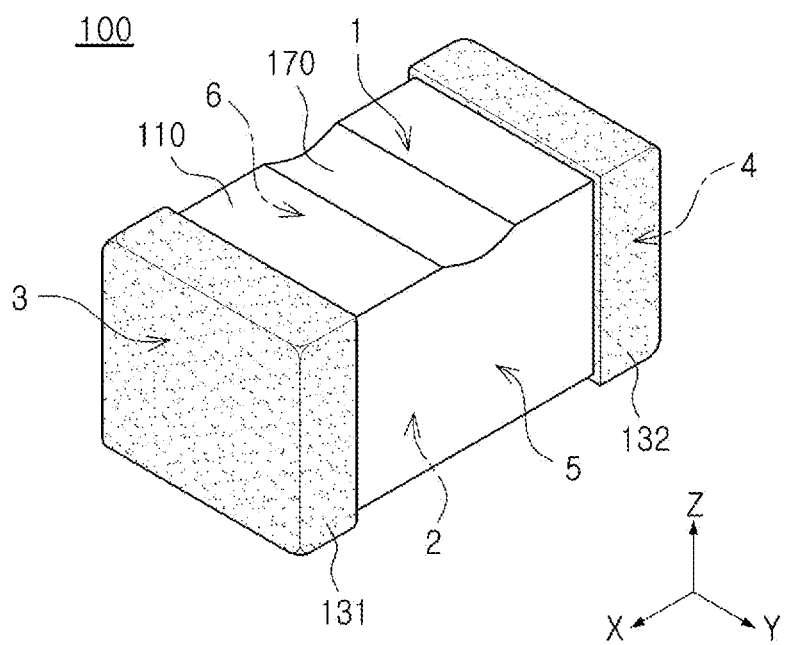
FIG. 2 is an upside-down perspective diagram of FIG. 1.
Figure 3A:
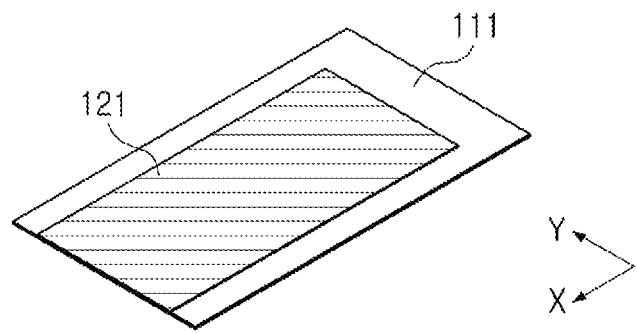
FIGS. 3A to 3C are perspective diagrams illustrating first and second internal electrodes and first and second dummy electrodes applied to the multilayer capacitor of FIG. 1.
Figure 3B:
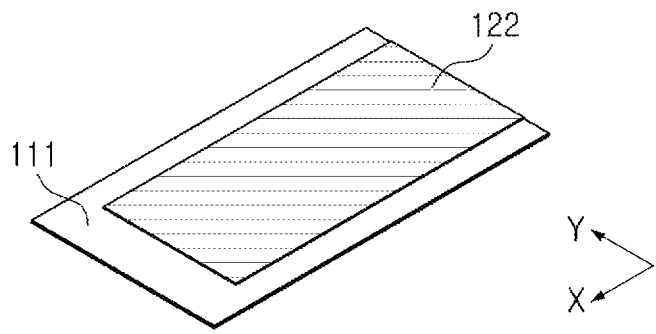
Figure 3C:
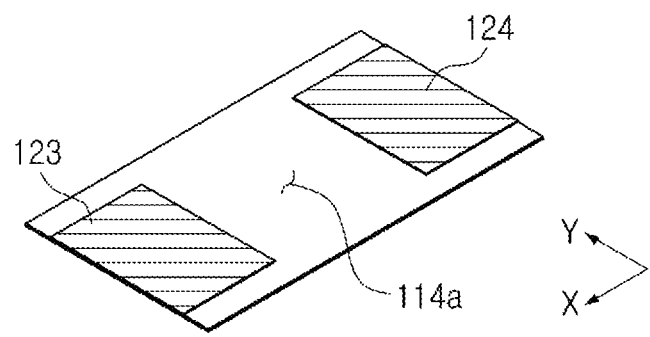
Figure 4:
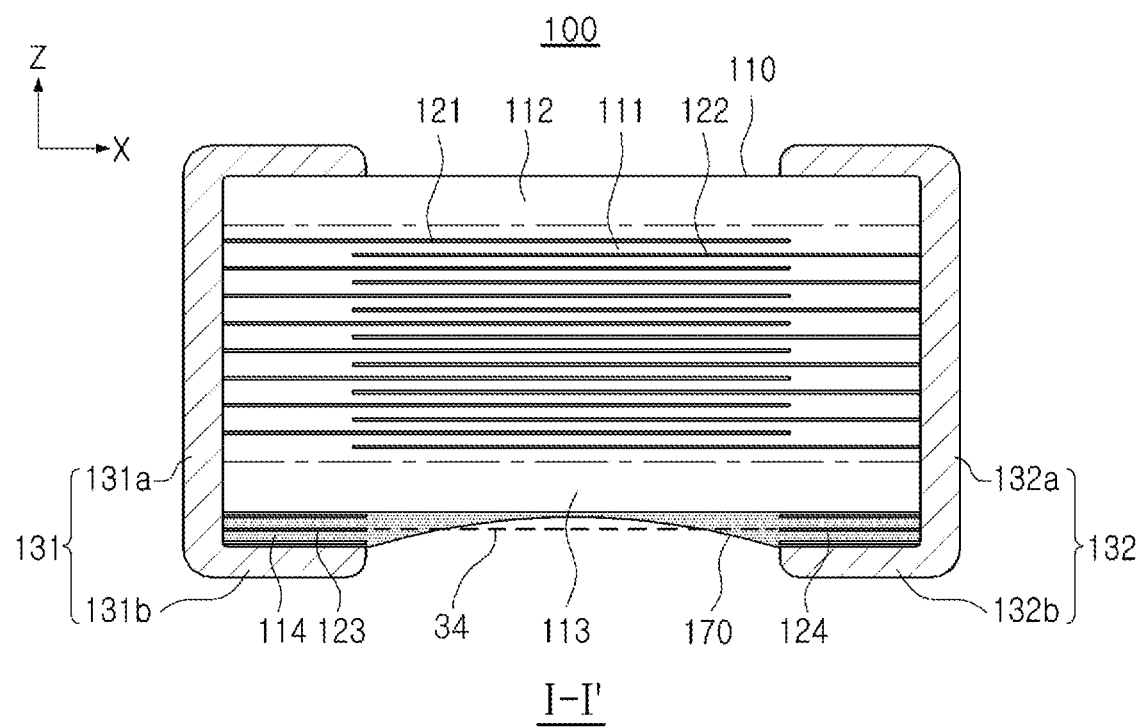
FIG. 4 is a cross-sectional diagram taken along line I-I' in FIG. 1.

FIG. 1 is a perspective diagram schematically illustrating a multilayer capacitor according to an example embodiment of the present disclosure, FIG. 2 is an upside-down perspective diagram of FIG. 1 while FIGS. 3A to 3C are perspective diagrams illustrating first and second internal electrodes and first and second dummy electrodes applied to the multilayer capacitor of FIG. 1, and FIG. 4 is a cross-sectional diagram taken along line I-I' in FIG. 1.

Referring to FIGS. 1 to 4, a multilayer capacitor 100 according to the example embodiment may include a body 110 on which a plurality of dielectric layers are laminated, a plurality of first and second internal electrodes 121 and 122, and first and second external electrodes 131 and 132 electrically connected to the first and second internal electrodes 121 and 122, respectively.

Hereinafter, in order to clarify exemplary embodiments in the present disclosure, directions of the capacitor body 110 are defined as follows. That is, X, Y, and Z illustrated in the drawings denote a length direction, a width direction, and a thickness of the capacitor body 110, respectively.

The body 110 is formed by alternately laminating a plurality of the dielectric layers 111 in a Z direction and sintering the same. Adjacent first dielectric layers 111 may be integrated such that boundaries therebetween may not be readily apparent without using scanning electron microscope (SEM).

The body 110 may have a hexahedral shape, but is not limited thereto.

A shape and a size of the body 110, and a number of laminated first dielectric layers 111 are not limited to those illustrated in the drawings set forth herein.

In the example embodiment, for the purpose of convenience in description, both surfaces of the body 110 opposing each other in a Z direction are defined as first and second surfaces 1 and 2, and both surfaces connected to the first and second surfaces 1 and 2 and opposing each other in an X direction are defined as third and fourth surfaces 3 and 4, while both surfaces connected to the first and second surfaces 1 and 2, connected to the first and second surfaces 1 and 2 and the third and fourth surfaces 3 and 4 and opposing each other in a Y direction are defined as fifth and sixth surfaces 5 and 6. In this case, the first surface 1 may be a mounting surface.

The dielectric layer 111 may include a ceramic material having a high dielectric constant, for example, $BaTiO_3$-based ceramic powder, or the like, but is not limited thereto, as long as sufficient capacitance can be obtained.

Further, a ceramic additive, an organic solvent, a plasticizer, a binding agent, a dispersant, and the like, may further be added to the dielectric layer 111, together with the ceramic powder.

As the ceramic additive, for example, a transition metal oxide or a transition metal carbide, a rare earth element, magnesium (Mg), aluminum (Al), or the like, may be used.

The body 110 may include an active region serving as apart contributing to forming the capacitance of the capacitor and upper and lower cover regions 112 and 113 respectively formed above and below the active regions as upper and lower margin portions in the Z direction.

The upper and lower cover regions 112 and 113 may have the same material and configuration as the first dielectric layer 111 except for not including internal electrodes.

The upper and lower cover regions 112 and 113 may be formed by laminating a single dielectric layer or two or more dielectric layers on upper and lower surfaces of the active region in the Z direction, respectively, and may prevent damage to the internal electrodes due to physical or chemical stress.

The body 110 includes first and second internal electrodes 121 and 122 in the active region.

The first and second internal electrodes 121 and 122 are electrodes applied with different polarities and are formed on one surface of the dielectric layer 111. One end of the first internal electrode 121 is exposed through the third surface 3 to be connected to the first external electrode 131 while one end of the second internal electrode 122 is exposed through the fourth surface 4 to be connected to the second external electrode 132.

The first and second internal electrodes 121 and 122 are electrically insulated from each other by the dielectric layer 111 interposed therebetween.

According to the configuration above, a charge is accumulated between the first and second internal electrodes when a predetermined voltage is applied to the first and second external electrodes 131 and 132.

Capacitance of the multilayer capacitor 100 is proportional to an area of the first and second internal electrodes 121 and 122 overlapped in the Z direction in the active region.

Meanwhile, a material for forming the first and second internal electrodes 121 and 122 is not particularly limited, but may be, for example, a precious metal such as platinum (Pt), palladium (Pd), a palladium-silver (Pd—Ag) alloy, and the like, and a conductive paste formed of at least one of nickel (Ni) and copper (Cu).

A method for printing the conductive paste may be a screen printing method, a gravure printing method, or the like, but is not limited thereto.

In the example embodiment, a thickness of the lower cover region 113 may be larger than a distance between the first and second internal electrodes 121 and 122 in the active region.

In this regard, when the active region is farther spaced apart from the mounting surface, and the multilayer capacitor 100 is mounted on the board, transfer of a vibration generated in the multilayer capacitor 100 can be reduced, thereby further reducing acoustic noise, as compared to a multilayer capacitor having a structure in which a buffer layer is disposed directly on a lower surface of an active region without a lower cover region.

The first and second external electrodes 131 and 132 are provided with voltages having different polarities and are formed on both ends of the body 110 in the X direction.

The first and second external electrodes 131 and 132 are formed of a conductive metal, for example, silver (Ag), palladium (Pd), platinum (Pt), nickel (Ni), copper (Cu) or alloys thereof, but are not limited thereto.

If necessary, first and second plating layers (not illustrated) may be formed on the first and second external electrodes 131 and 132.

The first and second plating layer may include a Ni-plating layer formed on the first and second external electrodes 131 and 132 and a tin (Sn)-plating layer formed on the Ni-plating layer.

Such first and second plating layer are for enhancing adhesion between the multilayer capacitor 100 and a board when mounting the multilayer capacitor 100 on the board as a solder. A plating treatment may be performed by a known method.

The first external electrode 131 may include a first connection portion 131a and a first bad portion 131b.

The first connection portion 131a is formed on the third surface 3 of the body 110 and is connected to an exposed portion of the first internal electrode 121.

The first band portion 131b extends from the first connection portion 131a to a portion of the first surface 1 of the capacitor body 110.

The first band portion 131b may further extend from the first connection portion 131a to portions of the second, fifth and sixth surfaces 2, 5 and 6 of the capacitor body 110 for enhanced adhesion, or the like.

The second external electrode 132 may include a second connection portion 132a and a first bad portion 132b.

The second connection portion 132a is formed on the fourth surface 4 of the body 110 and is connected to an exposed portion of the second internal electrode 122.

The second band portion 132b extends from the second connection portion 132a to a portion of the second surface 2 of the capacitor body 110.

The second band portion 132b may further extend from the second connection portion 132a to portions of the second, fifth and sixth surfaces 2, 5 and 6 of the capacitor body 110 for enhanced adhesion, or the like.

The body 110 may further include a buffer layer 114 formed on a lower surface of the lower cover region 110.

A groove 170 is inwardly recessed on a lower surface of the buffer layer 114.

The groove 170 may extend in a linear form from the fifth surface 5 to the sixth surface 6 of the body 110.

Additionally, a plurality of first and second dummy electrodes 123 and 124 may be disposed to face each other while being spaced apart by a predetermined gap in the X direction with respect to the groove 170.

Figure 5:
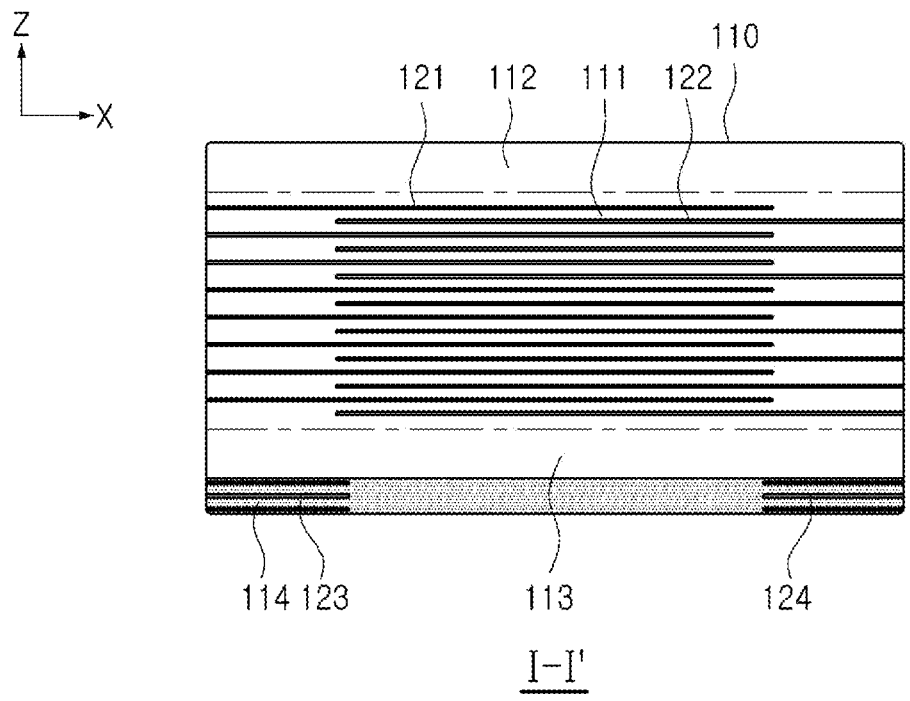
FIGS. 5 and 6 are side cross-sectional diagrams illustrating a method for forming a groove on amounting surface of a body when manufacturing a multilayer capacitor according to an example embodiment.
Figure 6:
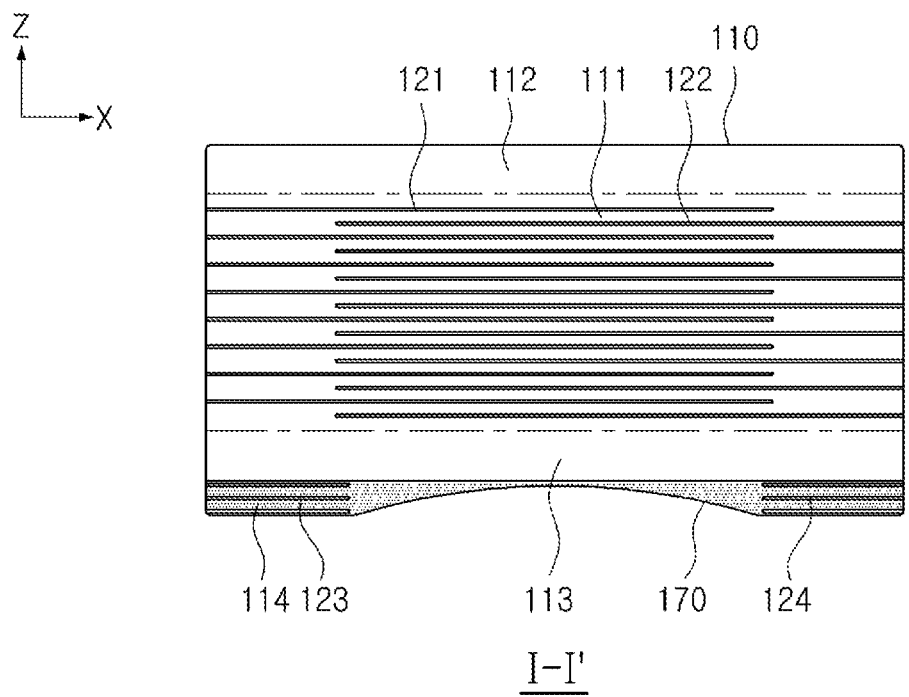

As illustrated in FIGS. 5 and 6, the gap between the first and second dummy electrodes 123 and 124 are elements for forming the groove 170 on the lower surface of the buffer layer 114 during a process of laminating and compressing the lower cover region, the active region, the upper cover region and the buffer layer.

That is, during the compression, a density of a region having no first and second dummy electrodes is lower than that having first and second dummy electrodes, thereby making a portion of the lower surface of the buffer layer 140 recessed and generating a step. This serves to form the groove 170 recessed on the lower surface of the buffer layer 140 upwardly.

Accordingly, the groove 170 may be disposed between the first and second dummy electrodes 123 and 124 in the X direction.

The groove 170 functions as an air layer and is configured to further reduce a vibration generated in the body 110 based on a principle that a vibration transmission rate is lower in a gas, a medium having a lower density, than in a solid, a medium having a higher density, such as a sound barrier on a road or an air layer insulation. The groove 170 may be intersected by a line 34 connecting the first and second dummy electrodes 123 and 124.

In this case, the first and second dummy electrodes 123 and 124 may be disposed on a single dielectric layer 114 in the X direction of the body 110.

The first and second dummy electrodes 123 and 124 may be exposed through the third and fourth surfaces 3 and 4 of the body to be electrically connected to the first and second external electrodes 131 and 132 and the first and second connection portions 131a and 132a.

Accordingly, equivalent series resistance (ESR) and equivalent serial inductance (ESL) of the multilayer capacitor may be lowered.

In general, as a path of an electrode inside a multilayer capacitor elongates, values of ESR and ESL thereof are lowered.

As described above, when ESL and ESR of the multilayer capacitor are lowered, noises of an electric signal are reduced in an IT device, thereby enhancing performance of an electronic device.

Further, the first and second dummy electrodes 123 and 124 prevent a lower portion of the body 110 from being contracted, thereby reducing delamination or cracking, and prevent the delamination from being transferred to the internal electrodes even when the same is generated, thereby improving reliability of a product.

According to the example embodiment, the buffer layer 114 is additionally prepared, and a general laminator is used to laminate the upper or lower cover region, the active region, and the lower or upper cover region to prepare a portion of the body followed by temporarily attaching the buffer layer 114 prepared in advance to the lower surface of the lower cover region and compressing the same to prepare the body 110.

Accordingly, a body is formed to have a groove formed on the lower surface thereof and have dummy electrodes. As directionality of the lamination is not necessarily limited from bottom to top or top to bottom, there is an advantage in that process freedom during body manufacturing is improved and manufacturing facilities are simplified to lower process difficulty.

Further, a groove is formed to be inwardly recessed on a mounting surface of the buffer layer of the multilayer capacitor, and a margin is secured between the active region and the buffer layer on which the groove is formed such that piezoelectric stress generated in the multilayer capacitor is dispersed and suppressed when mounting the multilayer capacitor on a board, thereby reducing the vibration transmitted to the board through solder and reducing acoustic noises.

In addition, when the vibration generated in the multilayer capacitor is reduced, adhesion between the multilayer capacitor and the board is enhanced, and durability of the multilayer capacitor is prevented from being deteriorated, thereby improving reliability thereof.

MODIFIED EXAMPLE

Figure 7:
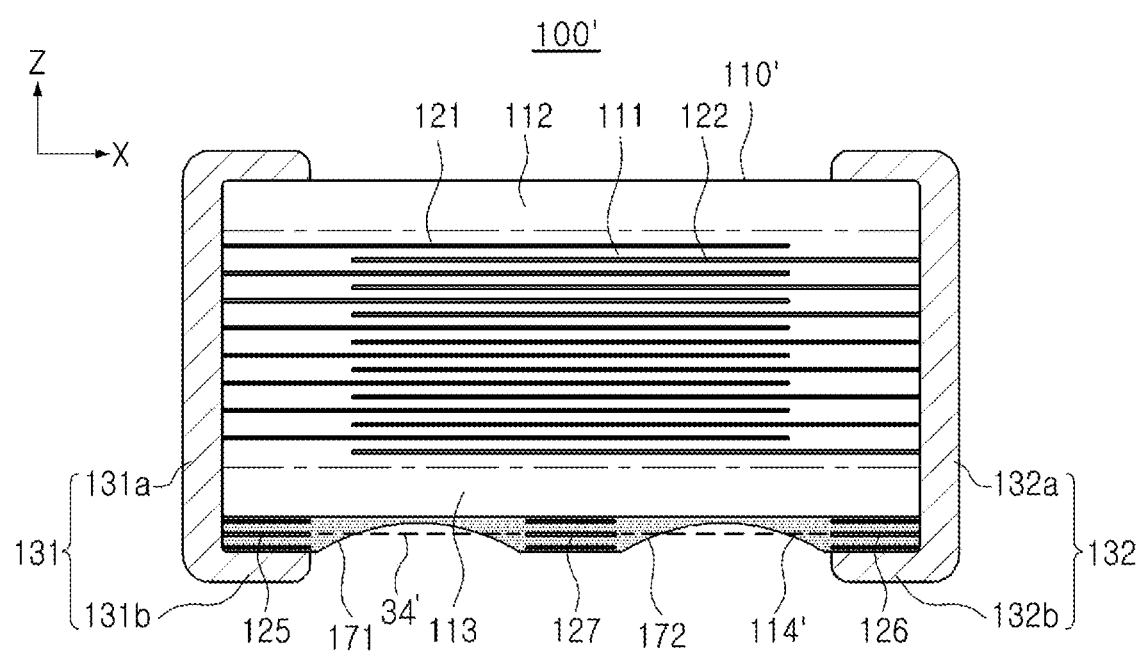
FIG. 7 is a cross-sectional diagram schematically illustrating a multilayer capacitor according to another example embodiment.
Figure 8:
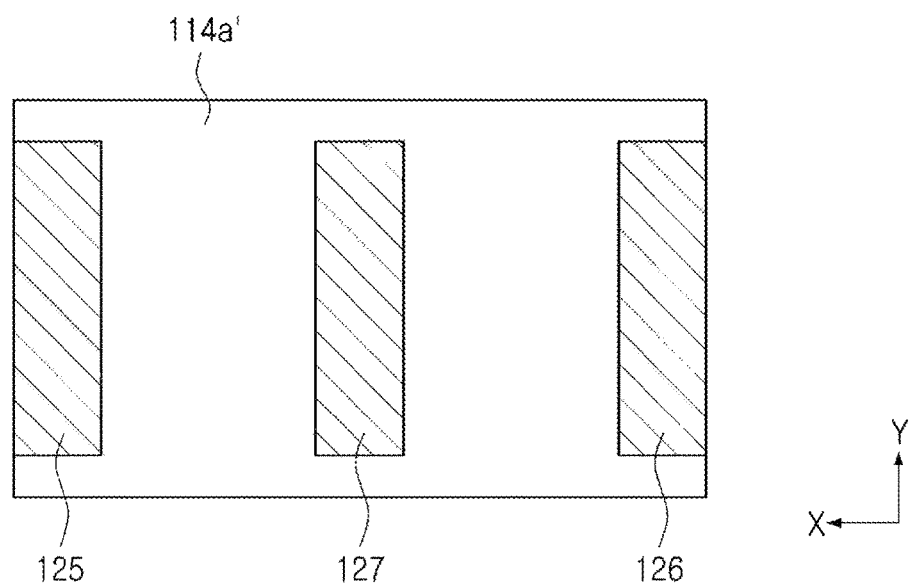
FIG. 8 is a plan view illustrating first to third dummy electrodes applied to the multilayer capacitor of FIG. 7.

FIG. 7 is a cross-sectional diagram schematically illustrating a multilayer capacitor according to another example embodiment, and FIG. 8 is a plan view illustrating first to third dummy electrodes applied to the multilayer capacitor of FIG. 7.

As the configurations of the active region, the upper and lower cover regions, the first and second internal and external electrodes are similar to those previously described, detailed descriptions thereof will be omitted to avoid repetition. A buffer layer having a different configuration from that previously described will be illustrated and described based on the difference.

Referring to FIGS. 7 and 8, a plurality of grooves 171 and 172 may be formed to be inwardly recessed on a lower surface of a buffer layer 114'.

Each of the grooves 171 and 172 may be formed in linear form while extending from the fifth surface 5 to the sixth surface 6.

The buffer layer 114' may further include a third dummy electrode 127 between the first and second dummy electrodes 125 and 126.

In this case, the first and second dummy electrodes 125 and 126 may be formed to be shorter in the X direction as compared to those described in the first embodiment.

The first to third dummy electrodes 125 to 127 may be spaced apart from each other on a single dielectric layer 114a' in the X direction of the body.

Further, the first and second dummy electrodes 125 and 126 are exposed through the third and fourth surfaces 3 and 4 of the body 110 to be electrically connected to the first and second connection portions 131a and 132a of the first and second external electrodes 131 and 132.

In this case, a gap between the first and third dummy electrodes 125 and 127 and a gap between the second and third dummy electrodes 126 and 127 are components for forming the grooves 171 and 172 on the lower surface of the buffer layer 114' during lamination of the lower cover region, the active region, the upper cover region and the buffer layer followed by compressing the same.

Accordingly, the groove 171 is located between the first and third dummy electrodes 125 and 127 in the X direction while the groove 172 is located between the second and third dummy electrodes 126 and 127 in the X direction.

In the example embodiment, two of the grooves 171 and 172 are illustrated, but the present disclosure is not limited thereto.

For example, three grooves may be formed to be spaced apart from each other in the X direction, and a number of the dummy electrodes disposed on a single dielectric layer may increase proportionally to a number of the grooves.

According to the configuration above, a body can be formed by appropriately adjusting a number of the grooves in accordance with a size of the multilayer capacitor. When a body is formed to have two or more grooves, rather than one groove, an effect of dispersing stress due to a plurality of the grooves may be enhanced.

In this regard, the effect of reducing acoustic noise can be further improved. In addition, a size of the groove can be more easily controlled when a larger number of smaller grooves are formed, as compared to when one large groove is formed.

Board for Mounting Multilayer Capacitor

Figure 9:
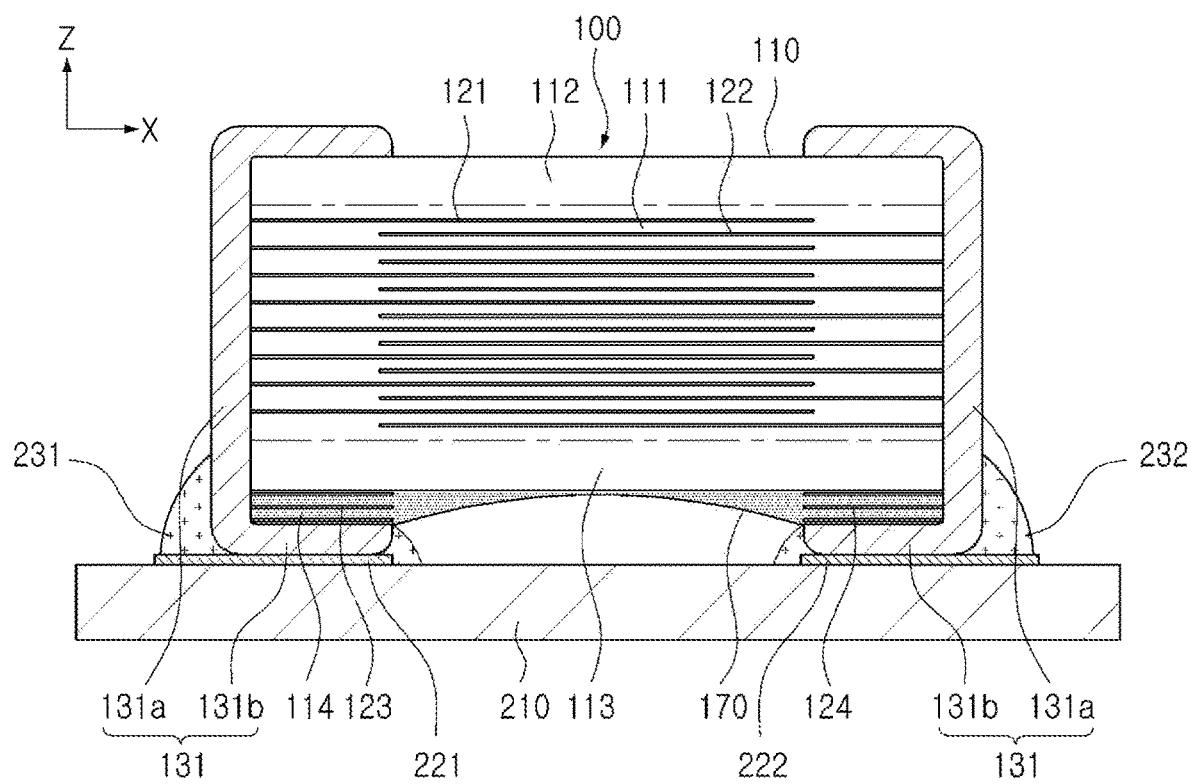
FIG. 9 is a cross-sectional diagram schematically illustrating the multilayer capacitor of FIG. 4 mounted on a board.

FIG. 9 is a cross-sectional diagram schematically illustrating the multilayer capacitor of FIG. 4 mounted on a board.

Referring to FIG. 9, a board for mounting the multilayer capacitor according to the example embodiment includes a board 210 on which the multilayer capacitor 100 is mounted, and first and second electrode pads 221 and 222 spaced apart on the board 210.

The multilayer capacitor 100 may be electrically connected to the board 210 by solders 231 and 232 while allowing the first and second external electrodes 131 and 132 being in contact with the first and second electrode pads 221 and 222.

Meanwhile, the example embodiment illustrates the multilayer capacitor of FIG. 4 in the form of being mounted; however, the present disclosure is not limited thereto. As an example, the multilayer capacitor illustrated in FIG. 7 is mounted on a board in a similar configuration, thereby forming a mounting board.

According to the aforementioned example embodiments, there is an effect of reducing acoustic noise of a multilayer capacitor.

While the exemplary embodiments have been shown and described above, it will be apparent to those skilled in the art that modifications and variations could be made without departing from the scope of the present invention as defined by the appended claims.

What is claimed is:

1. A multilayer capacitor, comprising:
a body comprising a plurality of dielectric layers laminated therein, an active region and upper and lower cover regions;
first and second internal electrodes disposed with the dielectric layer interposed therebetween in the active region to be alternately exposed through both end surfaces of the body; and
first and second external electrodes disposed on both ends of the body and connected to the first and second internal electrodes, respectively,
wherein the body further comprises a buffer layer comprising first and second dummy electrodes disposed on a lower surface of the lower cover region to be spaced apart from each other in a length direction of the body, and
a groove is recessed in a lower surface of the buffer layer so as to overlap at least one of the first dummy electrodes or the second dummy electrodes in the length direction.

2. The multilayer capacitor of claim 1,
wherein the groove extends from one side surface of the body to the other side surface of the body in a width direction of the body.

3. The multilayer capacitor of claim 1, wherein the first and second dummy electrodes are disposed on a single dielectric layer to face each other in the length direction.

4. The multilayer capacitor of claim 3, wherein the first and second dummy electrodes are exposed through both end surfaces of the body and are connected to the first and second external electrodes.

5. The multilayer capacitor of claim 1, wherein the groove is disposed between the first and second dummy electrodes.

6. The multilayer capacitor of claim 1, wherein a thickness of the lower cover region is greater than a distance between the first and second internal electrodes in the active region.

7. The multilayer capacitor of claim 1, wherein a plurality of the grooves are disposed on the lower surface of the buffer layer.

8. The multilayer capacitor of claim 7, wherein each of the plurality of the grooves extends from one side surface to the other side surface in a width direction of the body.

9. The multilayer capacitor of claim 7, wherein the buffer layer further comprises a third dummy electrode disposed between the first and second dummy electrodes.

10. The multilayer capacitor of claim 9, wherein the first to third dummy electrodes are spaced apart from each other on a single dielectric layer in the length direction of the body.

11. The multilayer capacitor of claim 9, wherein the first and second dummy electrodes are exposed through both end surfaces of the body and are connected to the first and second electrodes.

12. The multilayer capacitor of claim 9, wherein one of the plurality of the grooves is disposed between the first and third dummy electrodes and another of the plurality of the grooves is disposed between the second and third dummy electrodes.

13. The multilayer capacitor of claim 1, wherein the groove is intersected by a line connecting the first and second dummy electrodes.

14. A board for mounting a multilayer capacitor, comprising:
a board comprising first and second electrode pads on one surface thereof; and
the multilayer capacitor of claim 1,
wherein the first and second electrodes of the multilayer capacitor are mounted to be connected to the first and second electrodes pads, respectively.

15. A multilayer capacitor, comprising:
a body comprising a plurality of dielectric layers laminated therein, an active region and upper and lower cover regions;
first and second internal electrodes disposed with the dielectric layer interposed therebetween in the active region to be alternately exposed through both end surfaces of the body; and
first and second external electrodes disposed on both ends of the body and connected to the first and second internal electrodes, respectively,
wherein the body further comprises a buffer layer comprising first and second dummy electrodes disposed on a lower surface of the lower cover region to be spaced apart from each other in a length direction of the body,
a groove is recessed in a lower surface of the buffer layer and extends in a width direction of the body, the groove having a length greater than a length of the first or second dummy electrode in the length direction, and
a thickness of the lower cover region, devoid of any electrode, is greater than a distance between the first and second internal electrodes in the active region.

16. The multilayer capacitor of claim 15,
wherein the groove extends from one side surface of the body to the other side surface of the body in the width direction.

17. The multilayer capacitor of claim 15, wherein the groove overlaps at least one of the first dummy electrodes or the second dummy electrodes in the length direction.

18. The multilayer capacitor of claim 15, wherein the groove is disposed between the first and second dummy electrodes.

19. The multilayer capacitor of claim 15, wherein a plurality of the grooves are disposed on the lower surface of the buffer layer.

20. The multilayer capacitor of claim 15, wherein the groove is intersected by a line connecting the first and second dummy electrodes.

21. A multilayer capacitor, comprising:
a body comprising a plurality of dielectric layers laminated therein, an active region and upper and lower cover regions;
first and second internal electrodes disposed with the dielectric layer interposed therebetween in the active region to be alternately exposed through both end surfaces of the body; and
first and second external electrodes disposed on both ends of the body and connected to the first and second internal electrodes, respectively,
wherein the body further comprises a buffer layer comprising first and second dummy electrodes disposed on a lower surface of the lower cover region to be spaced apart from each other in a length direction of the body,
a groove is recessed in a lower surface of the buffer layer,
a thickness of the lower cover region, devoid of any electrode, is greater than a distance between the first and second internal electrodes in the active region, and
the groove is intersected by a line connecting the first and second dummy electrodes.

* * * * *